US012589865B2

(12) United States Patent
Zhao et al.

(10) Patent No.:  US 12,589,865 B2
(45) Date of Patent:      Mar. 31, 2026

(54) ULTRA-HIGH-SPEED HELICOPTER WITH STOWED SINGLE-BLADE COAXIAL ROTORS

(71) Applicant: Nanjing University of Aeronautics and Astronautics, Nanjing City (CN)

(72) Inventors: Guoqing Zhao, Nanjing City (CN); Yongsheng Shao, Nanjing City (CN); Qijun Zhao, Nanjing City (CN); Tinghan Liao, Nanjing City (CN); Xi Chen, Nanjing City (CN); Bo Wang, Nanjing City (CN); Yuan Gao, Nanjing City (CN)

(73) Assignee: Nanjing University of Aeronautics and Astronautics, Nanjing City (CN)

( * ) Notice: Subject to any disclaimer, the term of this patent is extended or adjusted under 35 U.S.C. 154(b) by 207 days.

(21) Appl. No.: 18/633,916

(22) Filed: Apr. 12, 2024

(65) Prior Publication Data

US 2025/0388316 A1      Dec. 25, 2025

(30) Foreign Application Priority Data

Apr. 13, 2023    (CN) ......................... 202310398908.1

(51) Int. Cl.
B64C 27/10 (2023.01)
B64C 1/14 (2006.01)
(Continued)

(52) U.S. Cl.
CPC ............ B64C 27/10 (2013.01); B64C 1/1407 (2013.01); B64C 5/02 (2013.01); B64C 27/26 (2013.01)

(58) Field of Classification Search
CPC .......... B64C 27/22; B64C 27/26; B64C 27/30
See application file for complete search history.

(56) References Cited

U.S. PATENT DOCUMENTS 3,612,444 A * 10/1971 Girard ..................... B64C 27/30
                                                               244/49
3,693,910 A * 9/1972 Aldi ........................ B64C 27/30
                                                               416/143
(Continued)

FOREIGN PATENT DOCUMENTS

ES            2289932 B1 * 3/2009 ............. B64C 27/26
FR            816813 A * 4/1936
WO    WO-2009149592 A1 * 12/2009 ............. B64C 27/08

*Primary Examiner* — Christopher P Ellis
(74) *Attorney, Agent, or Firm* — Jacob M. Ward; Ward Law Office LLC

(57) ABSTRACT

An ultra-high-speed helicopter with stowed single-blade coaxial rotors is provided and relates to the technical field of aircrafts. The ultra-high-speed helicopter includes a fuselage. Wings and tails can be arranged on the fuselage, respectively. Tail blades can be arranged at a tail end of the fuselage. A rotor mechanism can be arranged on a top of the fuselage. The rotor mechanism includes rotors. The rotor mechanism can drive the rotors to be stored in a rotor storage cabin of the fuselage. When the helicopter flies at high speed, the rotors stop working, and tail blades provide propulsive force and the wings provide lift force, so that the defects in the aerodynamic characteristics of the rotors are avoided during high-speed flight. In addition, the rotors can be retracted and stowed in a fuselage to further reduce drag and increase the maximum flight speed.

7 Claims, 6 Drawing Sheets

(51) Int. Cl.
  *B64C 5/02*            (2006.01)
  *B64C 27/26*           (2006.01)

(56)                    References Cited

U.S. PATENT DOCUMENTS

|  6,669,137 | B1 * | 12/2003 | Chen ................... | B64C 29/0025 |
|            |      |         |                        | 244/7 R |
| 10,894,599 | B1 * |  1/2021 | Popiks ................... | B64C 27/30 |
| 2016/0347446 | A1 * | 12/2016 | Vetter ................... | B64U 30/24 |
| 2020/0031462 | A1 * |  1/2020 | Svoboda, Jr. ........... | B64C 3/385 |
| 2023/0056974 | A1 * |  2/2023 | Foskey ................ | B64C 27/001 |

* cited by examiner

1

ULTRA-HIGH-SPEED HELICOPTER WITH STOWED SINGLE-BLADE COAXIAL ROTORS

CROSS-REFERENCE TO RELATED APPLICATION

This application claims the benefit and priority of Chinese Patent Application No. 202310398908.1 filed with the China National Intellectual Property Administration on Apr. 13, 2023, the disclosure of which is incorporated by reference herein in its entirety as part of the present application.

FIELD

The present disclosure relates to the technical field of aircrafts, in particular to an ultra-high-speed helicopter with stowed single-blade coaxial rotors.

BACKGROUND

Helicopters have unique application values in many aspects due to vertical take-off and landing capacity and high hovering efficiency, but compared with aircrafts, helicopters have a weakness of low flight speed.

The aerodynamic characteristics of rotors are the main reasons limiting the high-speed flight of helicopters. That is, during forward flight, shock waves are prone to occur on a forward side blade with the increase of flight speed, causing a sharp increase in drag. In addition, airflow separation is prone to occur on a backward side blade, and the airflow separation area is gradually expanded with the increase of flight speed. When a blade enters and exits the area during rotation, there is a significant change in the pitch moment of the blade, resulting in vibration and premature fatigue damage to the structure, and resulting in deterioration of the operational stability characteristics of the helicopters. In the prior art, it is difficult to eliminate the influence of rotors on the high-speed flight of helicopters.

SUMMARY

A purpose of the present disclosure is to provide an ultra-high-speed helicopter with stowed single-blade coaxial rotors so as to solve the problems in the prior art. When the helicopter flies at high speed, rotors stop working, and tail blades provide propulsive force and wings provide lift force, so that defects in the aerodynamic characteristics of the rotors are avoided during high-speed flight. In addition, the rotors can be retracted and stowed in a fuselage to further reduce drag and increase maximum flight speed.

In order to achieve the purpose, the present disclosure provides the following solution.

The present disclosure provides an ultra-high-speed helicopter with stowed single-blade coaxial rotors. The ultra-high-speed helicopter includes a fuselage; wings and tails, arranged on the fuselage, respectively; tail blades, arranged at a tail end of the fuselage, when the rotors are stored in a storage cabin, propulsive force of the helicopter is provided by the tail blades, lift force of the helicopter is provided by the wings, and the helicopter enters a blade-driven aircraft mode, so that high-speed flight is realized; a rotor mechanism, arranged on a top of the fuselage, the rotor mechanism includes rotors, the rotor mechanism can drive the rotors to be stored in a rotor storage cabin of the fuselage.

Optionally, the rotor mechanism includes a rotor storage mechanism and a coaxial blade reversing mechanism. The rotors are arranged on the coaxial blade reversing mechanism. The coaxial blade reversing mechanism is arranged on the rotor storage mechanism. The rotor storage mechanism can drive the coaxial blade reversing mechanism and the rotors to lift in the rotor storage cabin.

Optionally, the rotor storage mechanism includes a base fixedly arranged in the rotor storage cabin. Two symmetrically arranged rotor storage guide rails are fixedly arranged on the base. A coaxial blade reversing mechanism bracket is arranged between the two rotor storage guide rails. Both ends of the coaxial blade reversing mechanism bracket are slidably sleeved on the two rotor storage guide rails. A vertically arranged rotor storage rack is arranged at one side of the coaxial blade reversing mechanism bracket. A rotor storage gear is meshed and connected with the rotor storage rack. The rotor storage gear is mounted on the base through a rotor storage gear bracket. A joint is arranged at a side, away from the rotor storage rack, of the rotor storage gear bracket. An L-shaped groove is formed in the joint. A worm is arranged in the L-shaped groove. The worm can be switched from a horizontal state to a vertical state along the L-shaped groove. When the worm is switched to the vertical state, the worm is in meshing transmission connection with the side, away from the rotor storage rack, of the rotor storage gear.

Optionally, the coaxial blade reversing mechanism includes two left cranks and two right cranks which are arranged on the coaxial blade reversing mechanism bracket, and the two left cranks and the two right cranks are in transmission connection through a stay rod. A worm wheel is fixedly connected at a bottom of the two left cranks, and the worm is in transmission connection with the worm wheel when the worm is switched to the horizontal state. A first gear is fixedly connected at a top of the two left cranks. A second gear is meshed with the first gear, and the second gear is fixedly sleeved on a first rotor rotation shaft. A second rotor rotation shaft is movably arranged in the first rotor rotation shaft, and a bottom of the second rotor rotation shaft is fixedly connected with a top of the right cranks. The rotors are arranged on the first rotor rotation shaft and the second rotor rotation shaft, respectively.

Optionally, the rotors include an upper single rotor and a lower single rotor which are arranged in a vertical direction. Each of the upper single rotor and the lower single rotor includes a blade. The upper single rotor is arranged on the second rotor rotation shaft through a hub, and the lower single rotor is arranged on the first rotor rotation shaft through a hub.

Optionally, a rotor storage cabin door capable of being closed and opened is arranged at an opening formed in a top of the rotor storage cabin. The rotor storage cabin door can be controlled to open or close, so that storage and deployment of the rotors are completed.

Optionally, the wings are symmetrically arranged on both sides of the fuselage. When the rotors are stored in the fuselage, lift force of the aircraft is provided by the wings. Ailerons are arranged on the wings to provide rolling torque for rolling movement of the aircraft.

Optionally, the tails are arranged on both sides of the fuselage in a V-shaped structure to form a V-shaped tail, and rudders are arranged on the V-shaped tail. The V-shaped tail is consisted of a left wing surface and a right wing surface to form a V shape. The V-shaped tail can reduce the interference drag between the tails, as well as between the tails and the fuselage with fewer total number of components, so the flight speed of the blade-driven aircraft can be increased. Two V-shaped tail surfaces have a projection area in both a top-view direction and a side-view direction, so longitudinal (pitch) stabilization and course stabilization can be achieved at the same time. Therefore, the V-shaped tail has the functions of both a vertical tail and a horizontal tail. When the rudders on both sides are deflected in a same direction, the V-shaped tail is used as an elevator. When the rudders on both sides are deflected in different directions (differential), the V-shaped tail is used as a rudder.

Optionally, a circular through hole is formed in the base, the circular through hole is located at a bottom of the worm wheel, and diameter of the circular through hole is larger than diameter of the worm wheel.

Compared with the prior art, the present disclosure achieves the following technical effects.

When the ultra-high-speed helicopter with stowed single-blade coaxial rotors flies at high speed, the rotors stop working, and the tail blades provide propulsive force and the wings provide lift force, so that defects in aerodynamic characteristics of the rotors are avoided during high-speed flight. In addition, the rotors can be retracted and stowed in the fuselage to further reduce drag and increase maximum flight speed. Further, the rotation shafts of the blades of the upper single rotor and the lower single rotor are coaxially arranged, with opposite rotation directions, so that the deflection moment of unidirectional rotation is offset. Then, when the blades rotate to a forward side, the rotational speed can be reduced. When the blades rotate to a backward side, the rotational speed can be increased, so that the influence caused by the separation of shock waves on the forward side and airflow on the backward side is alleviated to some extent. In addition, the rotor system is different from the traditional multi-blade rotor system. In each blade disc plane, there is only one blade, and the two blades are located in two blade disc planes at different heights. Therefore, the blades in the upper and lower blade disc planes can rotate to a same phase at the same time, such as a corresponding phase above the rotor storage cabin, and then the rotors are driven to move up and down, thus the storage of the rotor system is completed by the rotor storage cabin. The rotor system is stored in the fuselage, and the flight drag is greatly reduced, so that the flight speed is greatly increased.

BRIEF DESCRIPTION OF THE DRAWINGS

To more clearly illustrate the present embodiment of the present disclosure or the technical solution in the prior art, the following briefly introduces the attached figures to be used in the present embodiment. Apparently, the attached figures in the following description show merely some embodiments of the present disclosure, and those skilled in the art may still derive other drawings from these attached figures without creative efforts.

Reference signs in the attached figures: 1, fuselage; 2, wing; 3, aileron; 4, lower single rotor; 5, V-shaped tail; 6, rudder; 7, tail blade; 8, rotor storage cabin door; 9, upper single rotor; 10, hub; 11, base; 12, rotor storage gear bracket; 13, rotor storage guide rail; 14, coaxial blade reversing mechanism bracket; 15, worm; 16, worm wheel; 17, rotor storage gear; 18, rotor storage rack; 19, first gear; 20, second gear; 21, stay rod; 22, first rotor rotation shaft; 23, second rotor rotation shaft; 24, left crank; 25, joint; and 26, right crank.

DETAILED DESCRIPTION OF THE EMBODIMENTS

The following clearly and completely describes the technical solution in the embodiments of the present disclosure with reference to the embodiments of the present disclosure. Apparently, the described embodiments are merely a part rather than all of the embodiments of the present disclosure. Based on the embodiment in the present disclosure, all other embodiments acquired by the ordinary technical staff in the art under the premise of without contributing creative labor belong to the scope protected by the present disclosure.

A purpose of the present disclosure is to provide an ultra-high-speed helicopter with stowed single-blade coaxial rotors so as to solve the problems in the prior art. When the helicopter flies at high speed, the rotors stop working, and tail blades provide propulsive force and the wings provide lift force, so that the defects in the aerodynamic characteristics of the rotors are avoided during the high-speed flight. In addition, the rotor can be retracted and stowed in a fuselage to further reduce the drag and increase the maximum flight speed.

To make the foregoing objective, features and advantages of the present disclosure clearer and more comprehensible, the present disclosure is further described in detail below with reference to the attached figures and specific embodiments.

Figure 1:
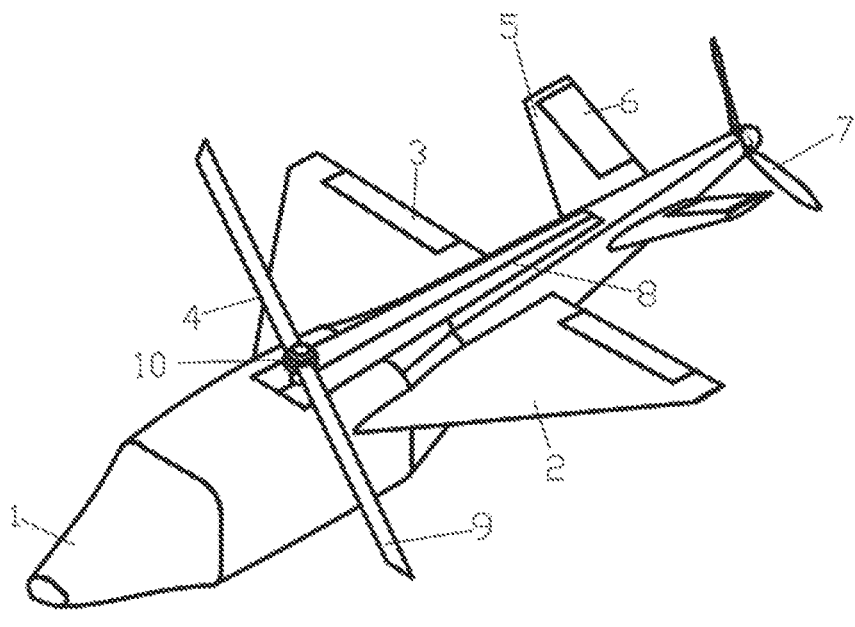
FIG. 1 is a structural schematic diagram of an ultra-high-speed helicopter with stowed single-blade coaxial rotors in the present disclosure.
Figure 2:
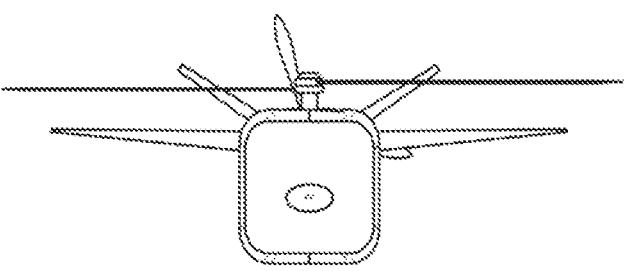
FIG. 2 is a front view of an ultra-high-speed helicopter with stowed single-blade coaxial rotors in the present disclosure.
Figure 3:
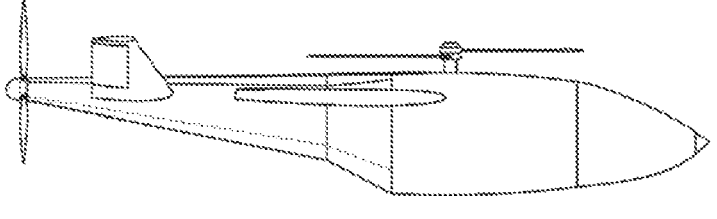
FIG. 3 is a side view of an ultra-high-speed helicopter with stowed single-blade coaxial rotors in the present disclosure.
Figure 4:
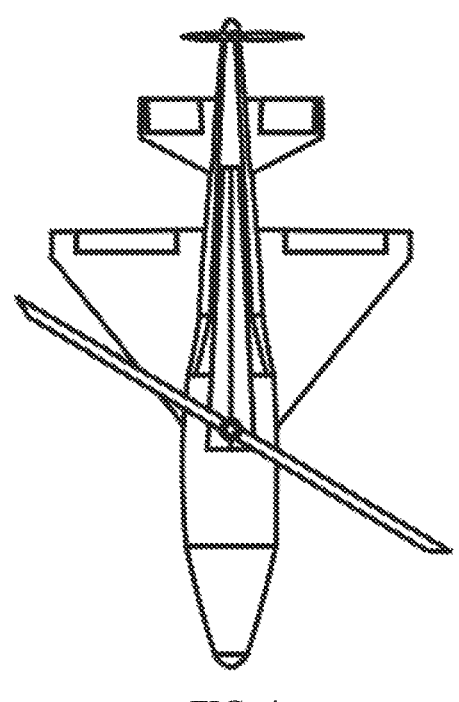
FIG. 4 is a top view of an ultra-high-speed helicopter with stowed single-blade coaxial rotors in the present disclosure.
Figure 5:
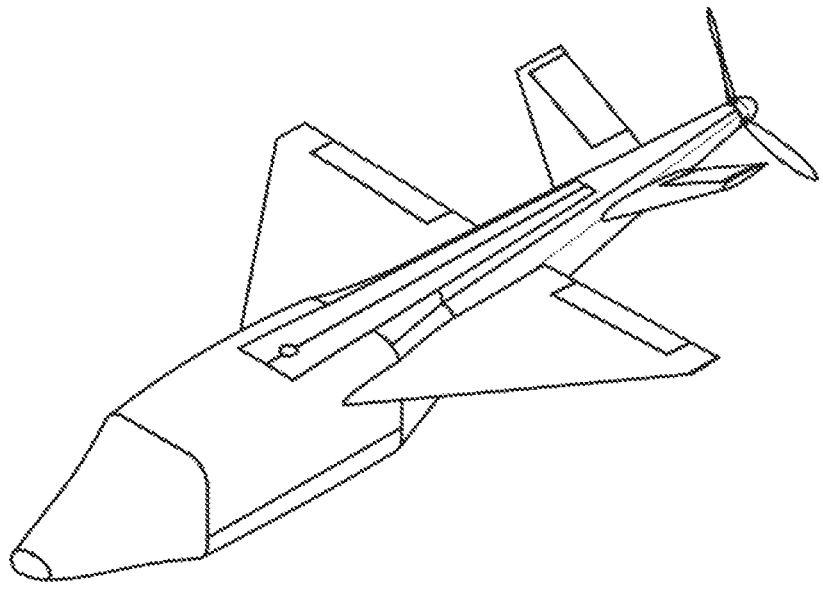
FIG. 5 is a state schematic diagram after rotors of an ultra-high-speed helicopter with stowed single-blade coaxial rotors are stored in the rotor storage cabin in the present disclosure.
Figure 6:
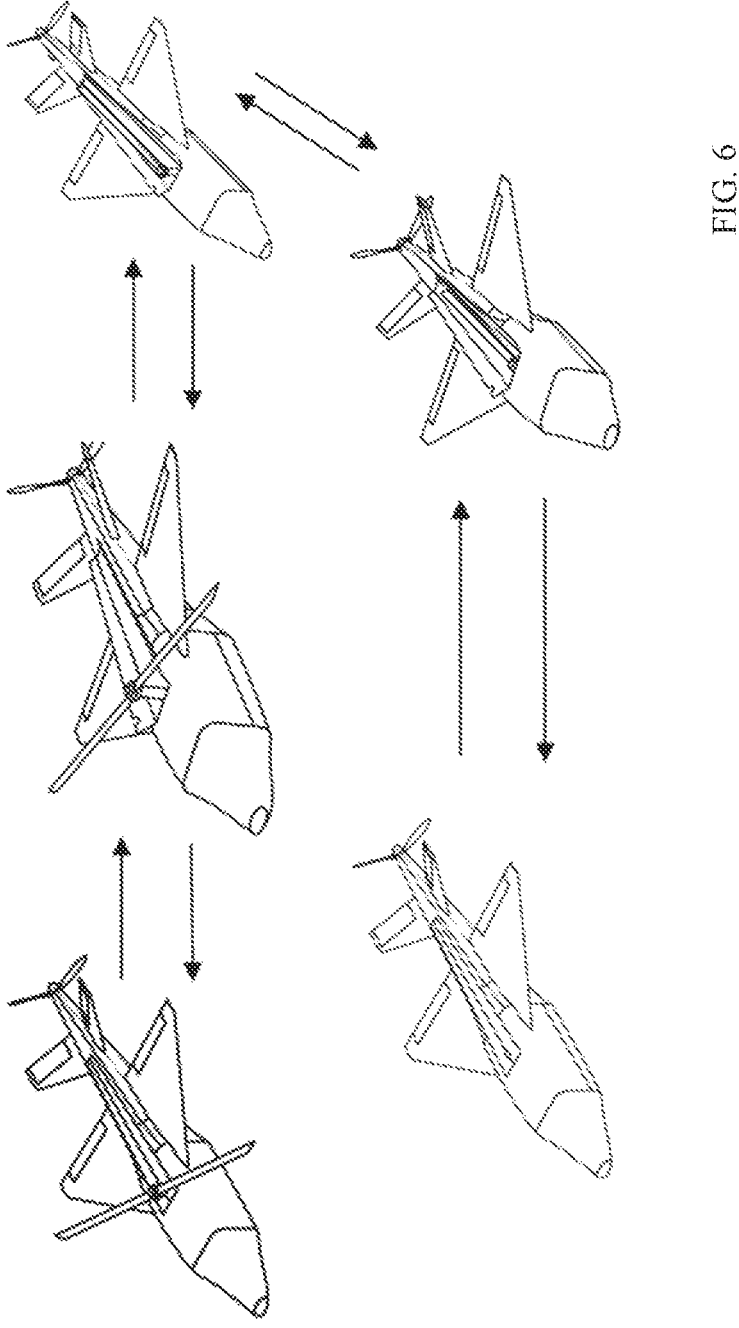
FIG. 6 is a schematic diagram of a switching process that rotors are stored in a rotor storage cabin and rotors are deployed in the present disclosure.

As a special aircraft, the helicopter is irreplaceable in many scenarios due to vertical take-off and landing capacity and higher hovering efficiency of the helicopter. However, due to the limitation of rotor aerodynamic characteristics, the flight speed of traditional helicopters is difficult to be further greatly increased, and the use scenarios of helicopters are greatly limited due to the weakness of short speed. In order to solve the problems, the present disclosure provides a novel high-speed helicopter solution including stowed coaxial single blades, high-lift wings and a tail blade. In the solution, the short speed weakness of traditional helicopters is compensated, the vertical take-off and landing and hovering advantages of the helicopter are also maintained, and the mission profiles and use scenarios of the helicopter are greatly enriched. Specifically, as shown in FIG. 1, FIG. 2, FIG. 3 and FIG. 4, an ultra-high-speed helicopter with stowed single-blade coaxial rotors provided by the present disclosure is applicable for ultra-high-speed flight. The ultra-high-speed helicopter includes a fuselage 1. Wings 2 and tail units arranged on the fuselage 1, respectively. tail blades 7 arranged at a tail end of the fuselage 1, when the rotors are stored in a storage cabin, propulsive force of the helicopter is provided by the tail blades 7, lift force of the helicopter is provided by the wings 2, and the helicopter enters a blade-driven aircraft mode, so that high-speed flight is realized; a rotor mechanism arranged on a top of the fuselage 1, the rotor mechanism includes rotors. As shown in FIG. 5 and FIG. 6, A rotor storage cabin is arranged in the fuselage 1. A rotor storage cabin door 8 can be controlled to open or close, so that the rotor mechanism can drive the rotors to be stored in the rotor storage cabin inside the fuselage to realize storage and deployment of the rotors. That is, stowed rotors are realized. When the rotors of the wings 2 on both sides of the fuselage 1 are stored in the fuselage, lift force of the helicopter is provided by the wings 2. Ailerons 3 are arranged on the wings to provide rolling moment for rolling movement of the helicopter. The tails are arranged on the fuselage 1 to form a V-shaped tail unit 5, and rudders 6 are arranged on the V-shaped tail 5. The V-shaped tail 5 is consisted of a left wing surface and a right wing surface to form a V shape. The V-shaped tail can reduce the interference drag between the tails as well as between the tails and the fuselage with fewer total number of components, so the flight speed of the blade-driven aircraft can be increased. Two tail surfaces in a V shape have a projection area in both a top-view direction and a side-view directions, so longitudinal (pitching) stabilization and course stabilization can be achieved at the same time. Therefore, the V-shaped tail has the functions of both a vertical tail and a horizontal tail. When the rudders on both sides are deflected in a same direction, the V-shaped tail is used as an elevator. When the rudders on both sides are deflected in different directions (differential), the V-shaped tail is used as a rudder.

Figure 7:
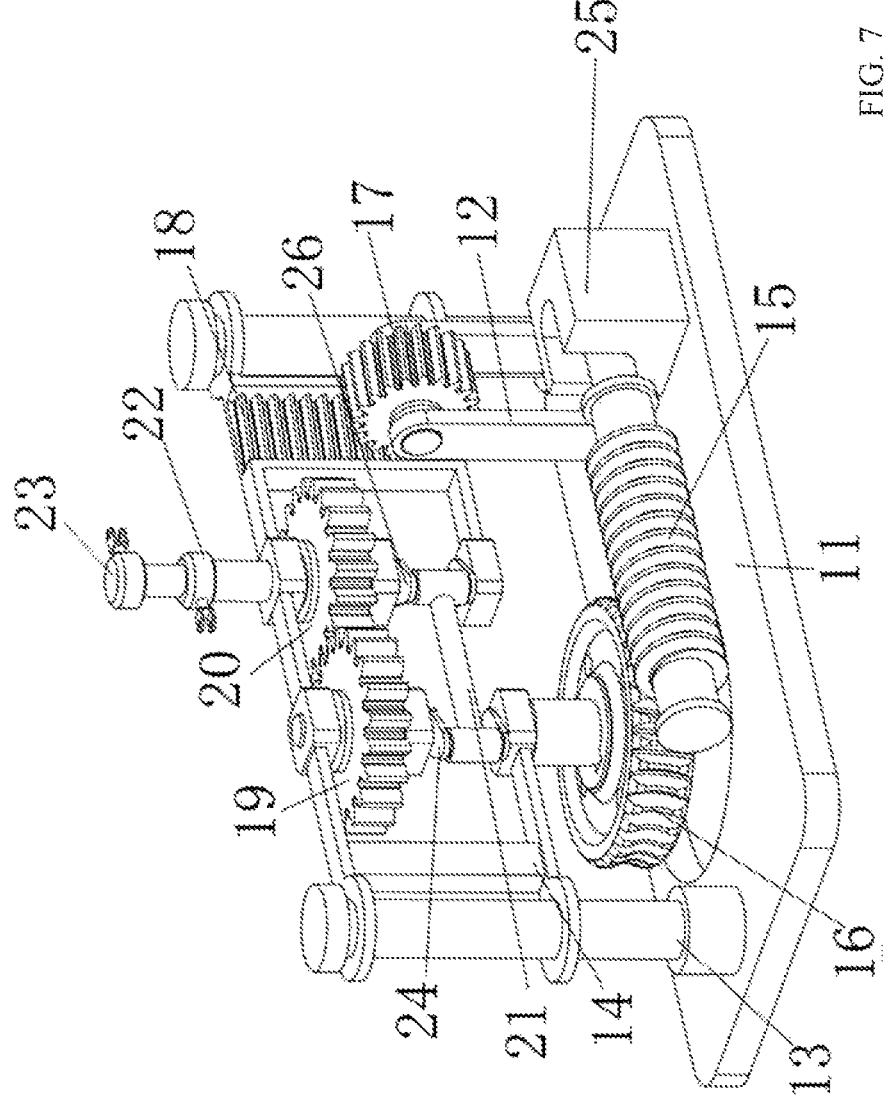
FIG. 7 is a schematic diagram of a coaxial blade reversing mechanism in the present disclosure.
Figure 8:
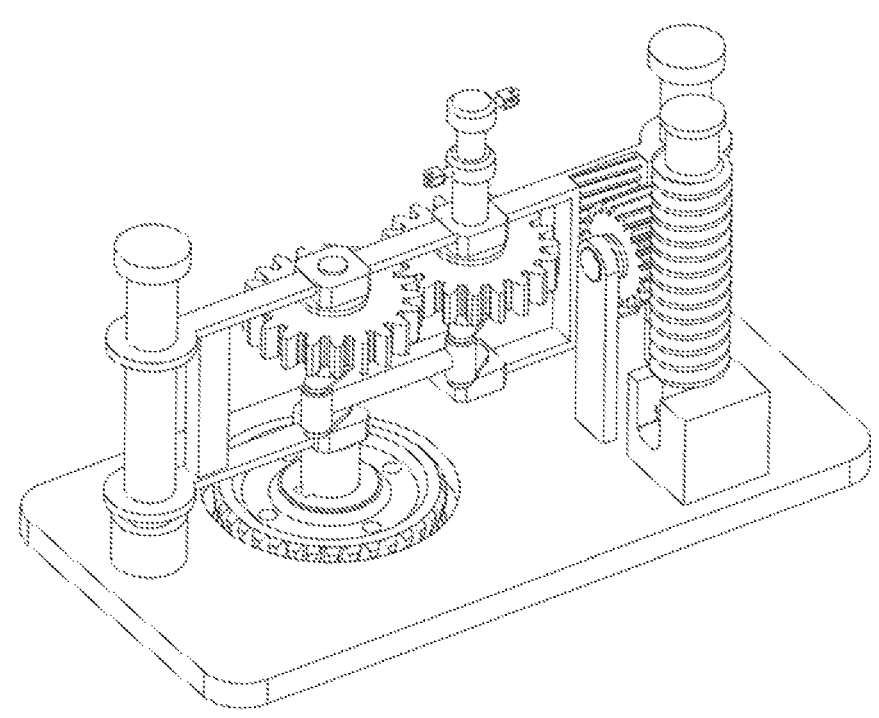
FIG. 8 is a schematic diagram of a rotor storage mechanism in the present disclosure.

Specifically, the rotor mechanism includes a rotor storage mechanism and a coaxial blade reversing mechanism. As shown in FIG. 7 and FIG. 8, the rotors are arranged on the coaxial blade reversing mechanism. The coaxial blade reversing mechanism is arranged on the rotor storage mechanism. The rotor storage mechanism can drive the coaxial blade reversing mechanism and the rotors to lift in the rotor storage cabin. The rotor storage mechanism includes a base 11 fixedly arranged in the rotor storage cabin. Two symmetrically arranged rotor storage guide rails 13 are fixedly arranged on the base 11. A coaxial blade reversing mechanism bracket 14 is arranged between the two rotor storage guide rails 13. Both ends of the coaxial blade reversing mechanism bracket 14 are slidably sleeved on the two rotor storage guide rails 13. The coaxial blade reversing mechanism can move up and down along the rotor storage guide rails 13. A vertically arranged rotor storage rack 18 is arranged at a side of the coaxial blade reversing mechanism bracket 14. A rotor storage gear 17 is meshed and connected with the rotor storage rack 18. The rotor storage gear 17 is mounted on the base 11 through a rotor storage gear bracket 12. A joint 25 is arranged at a side, away from the rotor storage rack 18, of the rotor storage gear bracket 12. An L-shaped groove is formed in the joint 25. A worm 15 is arranged in the L-shaped groove. The worm 15 is externally connected with a power system and can be switched from a horizontal state to a vertical state along the L-shaped groove as a power input end. When the worm 15 is switched to the vertical state, the worm 15 is in meshing transmission connection with a side, away from the rotor storage rack 18, of the rotor storage gear 17. When the rotors are stored, the worm 15 is in a vertical state. At that time, the rotation of the worm 15 drives the rotation of the rotor storage gear 17. The rotor storage gear 17 is meshed with the rotor storage rack 18. As a driving force input point, the rotor storage rack 18 drives the coaxial blade reversing mechanism to integrally move up and down along the rotor storage guide rails 13 to complete storage and unfolding of the rotor system.

The coaxial blade reversing mechanism includes two left cranks 24 and two right cranks 26 which are arranged on the coaxial blade reversing mechanism bracket 14, and the two left cranks 24 and the two right cranks 26 are in transmission connection through a stay rod 21. A worm wheel 16 is fixedly connected at a bottom of the two left cranks 24, and the worm 15 is in transmission connection with the worm wheel 16 when the worm 15 is switched to the horizontal state. A circular through hole is formed in the base 11. The circular through hole is formed located at a bottom of the worm wheel 16, and diameter of the circular through hole is larger than diameter of the worm wheel 16, so that the worm wheel 16 follows to move downwards in the circular through hole and cannot collide or interfere with the base 11 when the rotors are stored, and the worm wheel 16 is integrally stored in the rotor storage cabin. A first gear 19 is fixedly connected at a top of the two left cranks 24. A second gear 20 is meshed with the first gear 19, and the second gear 20 is fixedly sleeved on a first rotor rotation shaft 22. A second rotor rotation shaft 23 is movably arranged in the first rotor rotation shaft 22. The first rotor rotation shaft 22 and the second rotor rotation shaft 23 are coaxially arranged to realize common axis of the two rotors. A bottom of the second rotor rotation shaft 23 is fixedly connected with a top of the right cranks 26. When the coaxial blade reversing mechanism works, the worm 15 is in a horizontal state. At that time, the rotation of the worm 15 drives the worm wheel 16 to rotate. The worm wheel 16 is fixedly connected with the left crank 24 and the first gear 19, and the rotation directions of the worm wheel 16, the left crank 24 and the first gear 19 are the same. There are four cranks. The upper and lower cranks on the same side form a group of cranks, and the left and right cranks form two groups of cranks. That is, two cranks in a group as a left crank, and two cranks in another group as a right crank. The two groups of cranks are connected through the stay rod 21, and the right crank is driven by the left crank through the stay rod, so the steering directions of the two groups of cranks are the same. At the same time, the right crank 26 is fixedly connected with the second rotor rotation shaft 23, and the directions of the right crank 26 and the second rotor rotation shaft 23 are the same. That is, the steering directions of the two groups of cranks, the second rotor rotation shaft 23, the worm wheel 16 and the first gear 19 are the same. The first gear 19 is meshed with the second gear 20 and drives the second gear 20 to rotate, and the rotation directions of the second gear 20 and the first gear 19 are opposite. The second gear 20 is fixedly connected with the first rotor rotation shaft 22, so the steering directions of the second gear 20 and the first rotor rotation shaft 22 are the same. Therefore, the steering directions of the second gear 20 and the first rotor rotation shaft 22 are opposite to the steering directions of the two groups of cranks, the second rotor rotation shaft 23, the worm wheel 16 and the first gear 19. That is, the steering direction of the second rotor rotation shaft 23 is opposite to the steering direction of the first rotor rotation shaft 22, and the steering directions of the rotors arranged on the second rotor rotation shaft 23 and the first rotor rotation shaft 22 are opposite to each other, so that coaxial blade reverse is realized.

Further, preferably, the rotors include an upper single rotor 9 and a lower single rotor 4 which are arranged in an up-down manner. Each of the upper single rotor 9 and the lower single rotor 4 includes a blade, and The upper single rotor 9 and the lower single rotor 4 are both of a single-blade structure, so that single-blade coaxial rotors are realized. That is, the upper single rotor 9 is arranged on the second rotor rotation shaft 23 through a hub 10, and the lower single rotor 4 is arranged on the first rotor rotation shaft 22 through a hub 10. The rotation directions of the upper single rotor 9 and the lower single rotor 4 are opposite, so that the deflection moment of unidirectional rotation (which is consistent with the traditional coaxial blade reversing helicopter technical solution here) is offset. Then, when the blades rotate to the forward side, the rotational speed can be reduced. When the blades rotate to the backward side, the rotational speed can be increased, so that the influence caused by the separation of shock waves on the forward side and airflow on the backward side is alleviated to some extent. Through an arrangement of single blades on both upper and lower layers, the rotor system can be integrally stored into the fuselage, so that the flight drag is greatly reduced, the extreme flight speed is further increased, and high-speed flight or even ultra-high-speed flight can be achieved. The helicopter has vertical take-off and landing and high-efficiency hovering capacity of helicopters and high-speed cruising capacity of blade-driven aircrafts.

The working process in the present disclosure includes the following stages.

Firstly, at the vertical take-off stage, the helicopter can take off vertically from the deck of the ship or the airport and climb to the cruising altitude by using the pulling force of the single-blade coaxial rotor.

Secondly, at the transition stage from vertical take-off to high-speed cruising, after the helicopter climbs vertically to the cruising altitude, the tail blade 7 starts to provide propulsive force, the rotor storage cabin door 8 opens, the single-blade coaxial rotor turns to an upper part of the rotor storage cabin and stops rotating, a liftable blade hub can drive the single-blade coaxial rotor to descend to the height until the rotors are stored in the rotor storage cabin, and the rotor storage cabin door is closed immediately to complete flight mode conversion and enter a high-speed cruising mode.

Thirdly, at the high-speed cruising stage, the propulsive force is provided by the tail blade 7 of the helicopter, and the lift force is provided by the wings 2 of the helicopter. The rotors are stored in the fuselage, and high-speed and high-efficiency cruising is carried out in the form of a blade aircraft.

Fourthly, at the fixed height hovering operation stage, the helicopter approaches the destination in a high-speed and high-efficiency cruising state, the rotor storage cabin door is opened, the liftable blade hub drives the rotor to extend out of the cabin, the rotor storage cabin door 8 is closed, the rotor starts to rotate, thereby the helicopter switches to the helicopter mode and flies over the target at low speed for hovering operation.

In the description of the present disclosure, it needs to be illustrated that the indicative direction or position relations of the terms such as "center", "top", "bottom", "left", "right", "vertical", "horizontal", "inside" and "outside" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure. Moreover, the terms such as "first" and "second" are just used for distinguishing the description, but cannot be understood to indicate or hint relative importance.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In summary, the contents of this specification should not be understood as the limitation of the present disclosure.

What is claimed is:

1. An ultra-high-speed helicopter with stowed single-blade coaxial rotors, comprising a fuselage;

wings and tails arranged on the fuselage;

tail blades arranged at a tail end of the fuselage; and a rotor mechanism arranged on a top of the fuselage, the rotor mechanism comprises rotors, and the rotor mechanism can drive the rotors to be stored in a rotor storage cabin of the fuselage;

a rotor storage mechanism and a coaxial blade reversing mechanism, the rotors are arranged on the coaxial blade reversing mechanism, the coaxial blade reversing mechanism is arranged on the rotor storage mechanism, and the rotor storage mechanism can drive the coaxial blade reversing mechanism and the rotors to lift in the rotor storage cabin;

a base fixedly arranged in the rotor storage cabin, two symmetrically arranged rotor storage guide rails are fixedly arranged on the base, a coaxial blade reversing mechanism bracket is arranged between the two rotor storage guide rails, and both ends of the coaxial blade reversing mechanism bracket are slidably sleeved on the two rotor storage guide rails; and a vertically arranged rotor storage rack is arranged at one side of the coaxial blade reversing mechanism bracket, a rotor storage gear is meshed and connected with the rotor storage rack, the rotor storage gear is mounted on the base through a rotor storage gear bracket, a joint is arranged at a side, away from the rotor storage rack, of the rotor storage gear bracket, an L-shaped groove is formed in the joint, a worm is arranged in the L-shaped groove, the worm can be switched from a horizontal state to a vertical state along the L-shaped groove, and when the worm is switched to the vertical state, the worm is in meshing transmission connection with a side, away from the rotor storage rack, of the rotor storage gear.

2. The ultra-high-speed helicopter with stowed single-blade coaxial rotors according to claim 1, wherein the coaxial blade reversing mechanism comprises two left cranks and two right cranks which are arranged on the coaxial blade reversing mechanism bracket, and the two left cranks and the two right cranks are in transmission connection through a stay rod;

a worm wheel is fixedly connected at a bottom of the two left cranks, and the worm is in transmission connection with the worm wheel when the worm is switched to the horizontal state;

a first gear is fixedly connected at a top of the two left cranks, and a second gear is meshed with the first gear, the second gear is fixedly sleeved on a first rotor rotation shaft, a second rotor rotation shaft is movably arranged in the first rotor rotation shaft, and a bottom of the second rotor rotation shaft is fixedly connected with a top of the right cranks; and the rotors are arranged on the first rotor rotation shaft and the second rotor rotation shaft, respectively.

3. The ultra-high-speed helicopter with stowed single-blade coaxial rotors according to claim 2, wherein the rotors comprise an upper single rotor and a lower single rotor which are arranged in a vertical direction, the upper single rotor is arranged on the second rotor rotation shaft through a blade hub, and the lower single rotor is arranged on the first rotor rotation shaft through a blade hub.

4. The ultra-high-speed helicopter with stowed single-blade coaxial rotors according to claim 2, wherein a circular through hole is formed in the base, the circular through hole is located at a bottom of the worm wheel, and diameter of the circular through hole is larger than diameter of the worm wheel.

5. The ultra-high-speed helicopter with stowed single-blade coaxial rotors according to claim 1, wherein a rotor storage cabin door capable of being closed and opened is arranged at an opening formed in a top of the rotor storage cabin.

6. The ultra-high-speed helicopter with stowed single-blade coaxial rotors according to claim 1, wherein the wings are symmetrically arranged on both sides of the fuselage, and ailerons are arranged on the wings.

7. The ultra-high-speed helicopter with stowed single-blade coaxial rotors according to claim 1, wherein the tails are arranged on both sides of the fuselage in a V-shaped structure to form a V-shaped tail, and rudders are arranged on the V-shaped tail.

\* \* \* \* \*